United States Patent [19]

Cabrera

[11] Patent Number: 5,064,622

[45] Date of Patent: Nov. 12, 1991

[54] CONVERSION OF STACKED FCC UNIT

[75] Inventor: Carlos A. Cabrera, Northbrook, Ill.

[73] Assignee: UOP, Des Plaines, Ill.

[21] Appl. No.: 395,880

[22] Filed: Aug. 18, 1989

Related U.S. Application Data

[63] Continuation-in-part of Ser. No. 115,737, Nov. 2, 1987, Pat. No. 4,859,424.

[51] Int. Cl.$^5$ .................... F27B 15/16; F27B 15/02; B01J 8/26
[52] U.S. Cl. .............................. 422/144; 165/104.16; 422/143; 422/146
[58] Field of Search ...................... 422/143, 144, 146; 165/104.16

[56] References Cited

U.S. PATENT DOCUMENTS

| | | | |
|---|---|---|---|
| 3,821,103 | 6/1974 | Owen et al. | 422/144 X |
| 4,438,071 | 3/1984 | Vickers et al. | 422/146 X |
| 4,595,567 | 6/1986 | Hedrick | 422/146 |
| 4,786,622 | 11/1988 | Walters et al. | 422/144 X |

Primary Examiner—Robert J. Warden
Assistant Examiner—Amalia L. Santiago
Attorney, Agent, or Firm—Thomas K. McBride; John G. Tolomei

[57] ABSTRACT

Modern processes and arrangements for FCC processes can be obtained using a stacked FCC reactor-regenerator arrangement. These processes and arrangements use a stacked FCC unit having a bottom regeneration vessel, a superadjacent reactor vessel, and a stripping vessel laterally offset from and in open communication with the reactor vessel to make a two-stage regenerator having a lower first stage regeneration, an upper second stage of regeneration, and a catalyst cooler for removing feed from the catalyst. The process and arrangement makes complete use of the three existing vessels in the stacked reactor-regenerator arrangement by changing the function of the upper reactor vessel and the stripping vessel and adding a reactor vessel to the side of the stacked FCC arrangement. Therefore, apart from the addition of the new reactor only relatively minor modifications are necessary to more fully utilize stacked FCC reactor-regenerator arrangements.

2 Claims, 3 Drawing Sheets

CONVERSION OF STACKED FCC UNIT

CROSS-REFERENCE TO RELATED APPLICATIONS

This application is a continuation-in-part of U.S. Ser. No. 115,737 filed on Nov. 2, 1987, now U.S. Pat No. 4,859,424 issued Aug. 22, 1989.

BACKGROUND OF THE INVENTION

1. Field of the Invention

This invention relates to the fluidized catalytic cracking (FCC) conversion of heavy hydrocarbons into lighter hydrocarbons with a fluidized stream of catalyst particles and regeneration of the catalyst particles to remove coke which acts to deactivate the catalyst. More specifically, this invention relates to the apparatus and process for fluidized catalytic cracking of hydrocarbons.

2. Description of the Prior Art

Catalytic cracking is accomplished by contacting hydrocarbons in a reaction zone with a catalyst composed of finely divided particulate material. The reaction in catalytic cracking, as opposed to hydrocracking, is carried out in the absence of added hydrogen or the consumption of hydrogen. As the cracking reaction proceeds, substantial amounts of coke are deposited on the catalyst. A high temperature regeneration within a regeneration zone operation burns coke from the catalyst. Coke-containing catalyst, referred to herein as spent catalyst, is continually removed from the reaction zone and replaced by essentially coke-free catalyst from the regeneration zone. Fluidization of the catalyst particles by various gaseous streams allows the transport of catalyst between the reaction zone and regeneration zone. Methods for cracking hydrocarbons in a fluidized stream of catalyst, transporting catalyst between reaction and regeneration zones, and combusting coke in the regenerator are well known by those skilled in the art of FCC processes. To this end, the art is replete with vessel configurations for contacting catalyst particles with feed and regeneration gas, respectively.

One well known configuration of FCC unit that gained wide acceptance during the 1950's and 1960's is a stacked FCC reactor and regenerator. This design comprises a reactor vessel stacked on top of a regenerator vessel. Regenerated catalyst flows from the regeneration vessel through a regenerator standpipe into a riser where it contacts an FCC charge stock. Expanding gases from the charge stock and fluidizing medium convey the catalyst up an external riser and into the reactor vessel. Cyclone separators in the reactor divide the catalyst from reacted feed vapors which pass into an upper recovery line while the catalyst collects in the bottom of the reactor. A stripping vessel, supported from the side of the reactor vessel, receives spent catalyst from the reaction zone. Steam rises from the bottom of the stripper, countercurrent to the downward flow catalyst, and removes sorbed hydrocarbons from the catalyst. Spent catalyst continues its downward movement from the stripper vessel through a reactor standpipe and into a dense fluidized catalyst bed contained within the regeneration vessel. Coke on the spent catalyst reacts with oxygen in air stream that ascends through the regeneration vessel and ultimately becomes regeneration gas. Again, cyclone separators at the top of the regenerator return catalyst particles to the dense bed and deliver a relatively catalyst-free regeneration gas to an overhead gas conduit.

Changes in regeneration technique, types of available feedstock, and higher throughput requirements have greatly diminished the utility and viability of these stacked arrangements. Since the introduction of the stacked FCC arrangement, two particularly useful additions to regeneration technique include multiple stage regeneration and the addition of means to remove heat from the regenerator. The major impetus for adopting these changes is the need to improve conversion of a wide variety of feedstocks.

Optimization of feedstock conversion ordinarily requires essentially complete removal of coke from the catalyst. This essentially complete removal of coke from catalyst is often referred to as complete regeneration. Complete regeneration produces a catalyst having less than 0.1 and preferably less than 0.05 weight percent coke. In order to obtain complete regeneration, oxygen in excess of the stoichiometric amount necessary for the combustion of coke to carbon oxides is charged to the regenerator. Excess oxygen in the regeneration zone will also react with carbon monoxide produced by the combustion of coke thereby yielding a further evolution of heat. When CO combustion occurs in a relatively catalyst-free zone of the regenerator, such as the region above the dense fluidized bed in a single regenerator vessel, the resulting high temperatures may lead to severe equipment damage. Such situations may be avoided if the CO combustion takes place in the presence of catalyst particles which act as a heat sink. Therefore, regenerators are generally designed to avoid the combination of free oxygen and carbon monoxide in regions that are relatively free of catalyst. Despite this, the heat evolved from unintended CO combustion may raise the temperature of the catalyst to the point of causing thermal deactivation of the catalyst or may affect the process by limiting the amount of catalyst that can contact the feedstock. The problems of controlling catalyst and regenerator temperatures are exacerbated by the application of FCC processes to crack heavy feedstocks. With the increased coke producing tendencies of these heavy or residual feeds, a complete regeneration of catalyst becomes more difficult due to the excessive heat evolution associated with coke and CO combustion. A common approach to minimizing CO combustion while yet obtaining fully regenerated catalyst has been to perform the regeneration in stages.

Apart from the objective of minimizing CO combustion, the increase in coke on spent catalyst results in a larger amount of coke being burnt in the regenerator per pound of catalyst circulated. Heat is removed from the regenerator in conventional FCC units in the flue gas and principally in the hot regenerated catalyst stream. An increase in the level of coke on spent catalyst will increase the temperature difference between the reactor and the regenerator, and the regenerated catalyst temperature overall. A reduction in the amount of catalyst circulated is, therefore, necessary in order to maintain the same reactor temperature. However, this lower catalyst circulation rate required by the higher temperature difference between the reactor and the regenerator will lower hydrocarbon conversion, making it necessary to operate with a higher reactor temperature in order to maintain conversion at the desired level. This will cause a change in yield structure which may or may not be desirable, depending on what products are required from the process. Also, there are limitations to the temperatures that can be tolerated by FCC catalyst without there being a substantial detrimental effect on catalyst activity. Generally, with commonly available modern FCC catalyst, temperatures of regenerated catalyst are usually maintained below 760° C. (1400° F.), since loss of activity would be very severe at about 760°-790° C. (1400°-1450° F.). If a relatively common reduced crude such as that derived from Light Arabian crude oil were charged to a conventional FCC unit, and operated at a temperature required for high conversion to lighter products, i.e., similar to that for a gas oil charge, the regenerator temperature would operate in the range of 870°-980° C. (1600°-1800° F.). This temperature would be too high a temperature for the catalyst, require very expensive materials of construction, and give an extremely low catalyst circulation rate. It is, therefore, accepted that when materials are processed that would give excessive regenerator temperatures, a means must be provided for removing heat from the regenerator, which enable a lower regenerator temperature, and a lower temperature difference between the reactor and the regenerator to be obtained.

INFORMATION DISCLOSURE

Staged regeneration systems are well known in the regeneration of FCC catalyst. Luckenbach, U.S. Pat. No. 3,958,953, describes a staged flow system having concentric catalyst beds separated by baffles which open into a common space for collecting spent regeneration gas and separating catalyst particles. Myers et al. in U.S. Pat. No. 4,299,687 teach the use of a staged regenerator system having superimposed catalyst beds wherein spent catalyst particles first enter an upper dense fluidized bed of catalyst and are contacted with regeneration gas from the lower catalyst bed and fresh regeneration gas. After partial regeneration in the first regeneration zone, catalyst particles are transferred by gravity flow into a lower catalyst bed to which is charged a stream of fresh regeneration gas. The Myers' invention is directed to the processing of residual feeds and uses the two-stage regeneration process to limit CO combustion thereby reducing overall heat output within the regenerator.

The use of relatively dilute phase regeneration zones to effect complete catalyst regeneration is shown by Stine et al. in U.S. Pat. No. 3,844,973 and 3,923,606. Stine et al. seeks primarily to effect complete CO combustion for air pollution, thermal efficiency, and equipment minimization reasons by using increased gas velocities to transport catalyst through dense bed and relatively dilute phase regeneration zones. A two-stage system which combines a relatively dilute phase transport zone with a dense bed zone for regenerating catalyst used in cracking residual feeds is shown by Dean et al. in U.S. Pat. No. 4,336,103. In Dean, a first dense bed is used to initiate coke combustion in a lower portion of a regeneration section is followed by an upper dilute phase regeneration section operating at high severity to complete regeneration and combustion of carbon monoxide. Dean's method uses a modified version of a stacked FCC configuration wherein the dense regeneration portion is the regeneration vessel of the stacked configuration and the dilute phase regeneration takes place in an additional vessel located to the side of the stacked configuration.

A common prior art means for removing heat from a regenerator provides coolant filled coils within the regenerator which are in contact with the catalyst. For example, Medlin et al. U.S. Pat. No. 2,819,951, McKinney U.S. Pat. No. 3,990,992, and Vickers U.S. Pat. No. 4,219,442 disclose fluid catalytic cracking processes using dual zone regenerators with cooling coils positioned in the second zone. The prior art is also replete with disclosures of FCC processes which utilize dense or dilute phase regenerated fluid catalyst heat removal zones or heat exchangers, that are external to the regenerator vessel, to cool hot regenerated catalyst for return to the regenerator. Examples of such disclosures are as set forth in Harper U.S. Pat. No. 2,970,117; Owens U.S. Pat. No. 2,873,175; McKinney U.S. Pat. No. 2,862,798; Watson et al. U.S. Pat. No. 2,596,748; Jahnig et al. U.S. Pat. No. 2,515,156; Berger U.S. Pat. No. 2,492,948; Watson U.S. Pat. No. 2,506,123; and Lomas et al. U.S. Pat. No. 4,434,245. Another U.S. Pat. No. 4,439,533 issued to Lomas et al. shows an external heat removal zone in which catalyst is circulated between the heat removal zone and the regeneration vessel across a single passage that communicates the two zones.

Since the stacked type FCC arrangements were normally designed to operate with only a single stage of regeneration and did not contain any provision for external heat removal from the catalyst, the stacked arrangement in its present form cannot accommodate two stage regeneration and catalyst heat removal. The perceived need for extensive modification greatly reduces the viability of the existing, stacked FCC configurations. Furthermore, it is common to find stacked FCC units where the single stage of regeneration operates in a partial CO combustion mode. Typically, when operated for partial CO combustion, the regeneration vessel will contain equipment that is unsuitable for the higher temperatures that accompany complete CO regeneration. The need to upgrade equipment in many stacked FCC configurations for present day operating practice further reduces the current utility of these units.

A number of stacked configurations have been upgraded to accommodate higher operating temperature. Common approaches to this type of upgrading include the replacement of internal equipment with more heat resistant equipment and the use of internal insulation or external convection devices to reduce the skin temperature of metal components such as conduits and vessel shells. In this regard it is commonly found that the metallurgy of old reactor vessels is unsuitable for the increased reactor temperatures that are now preferred. The limitation on reactor temperature places a constraint on conversion and provides an incentive to refiners to replace the reactor vessel.

The present invention provides a method for utilizing a majority of the existing structures associated with a stacked FCC arrangement as part of a new FCC configuration having two stage regeneration and an external heat removal section. This conversion also allows the owner of an existing stacked FCC configuration to greatly increase the processing capacity of the unit, including the processing of heavier feedstocks, while minimizing capital expenditure for new equipment. Minimization of capital expenditure is achieved by utilization of the reactor vessel, regeneration vessel and stripper vessel from the stacked configuration.

SUMMARY OF THE INVENTION

This invention is an FCC apparatus and process derivable from a stacked FCC arrangement. In this arrangement, the stacked FCC arrangement operates as a regenerator having at least two stages of regeneration that is used as part of an enlarged FCC process. In simplest form, the apparatus or process uses the regeneration vessel as a first-stage regeneration zone, the reactor vessel as a second-stage regeneration zone, and the reactor stripper as a catalyst heat removal zone.

In one embodiment this invention is an apparatus for converting a hydrocarbon feed in a reaction zone using fluidized catalyst particles and continuously regenerating the catalyst particles after contact with said hydrocarbon feed. The apparatus includes a reactor riser conduit for receiving the hydrocarbon feed which has an upstream end in communication with a regenerated catalyst conduit to receive catalyst particles and an open downstream end for discharging a mixture of the hydrocarbons and catalyst particles into a reactor vessel that communicates with the downstream end of the riser conduit. The reactor vessel encloses means for at least partially separating the hydro-carbons from the catalyst particles. A stripping vessel in open communication with a lower portion of the reactor vessel collects catalyst particles from the reactor vessel. A spent catalyst conduit having an inlet end in communication with a lower portion of the stripping vessel transfers catalyst particles to a lower vessel in a stacked regeneration tower. The stacked regeneration tower comprises the lower vessel and an upper vessel located superadjacent to and concentrically supported from the lower vessel, and the upper vessel has a smaller diameter than the lower vessel. The lower vessel includes means for distributing an oxygen-containing gas over a lower section of the lower vessel. A lower catalyst conduit withdraws catalyst particles from the lower vessel and the lower catalyst conduit has at least a lower portion positioned external to the lower vessel. A regenerator riser conduit communicates with the lower end of the lower catalyst conduit and receives catalyst particles therefrom and has a lower end positioned external to the upper and lower vessels and an upper end in communication with the upper vessel to discharge catalyst particles therein. Means are provided for injecting an oxygen-containing gas into a lower portion of the regenerator riser conduit. A first cooler vessel horizontally offset from and in direct communication with the upper vessel circulates catalyst particles from the upper vessel to the cooler vessel, and the cooler vessel has means for indirectly contacting the catalyst particles therein with a cooling fluid and means for distributing a fluidizing medium over a lower portion of the cooler vessel.

In another embodiment, this invention is a process for converting a hydrocarbon feed in a reaction zone using fluidized catalyst particles and continuously regenerating the catalyst particles after contact with the hydrocarbon feed in a regeneration zone, wherein the reaction zone and regeneration zone comprise a stacked FCC arrangement having a bottom regenerator vessel, a superadjacent upper vessel for reacting the hydrocarbon feed with the catalyst particles, an external conduit for withdrawing catalyst from a lower portion of the regeneration vessel and transporting catalyst particles to the upper vessel, means for injecting a hydrocarbon feed into the external conduit, means for adding spent catalyst particles to the bottom regenerator vessel, means for recovering regeneration gas from an upper portion of the bottom regenerator vessel, means for withdrawing hydrocarbon vapor from an upper portion of the reactor vessel, and a side vessel laterally offset from and in open communication with the reactor vessel for stripping the catalyst particles. This invention improves the process for converting the hydrocarbon feed in the stacked FCC arrangement by operating the upper vessel as a second stage regeneration zone and collecting catalyst particles from the lower portion of the upper vessel using a catalyst withdrawal conduit that communicates with means for collecting catalyst particles from the lower portion of the upper vessel and withdrawing regeneration gas from the upper end of the upper vessel; withdrawing heat from catalyst particles in the side vessel by indirectly contacting catalyst particles therein with a cooling fluid, distributing fluidizing gas into the side vessel and operating the side vessel as an external catalyst heat removal zone; injecting a lift gas into the external conduit in place of hydrocarbon feed, operating the external conduit as a regenerator riser conduit and transferring at least partially regenerated catalyst particles from the bottom regeneration vessel to the upper vessel; transferring regenerated catalyst from the catalyst withdrawal conduit to a riser reaction zone located to the side of the stacked FCC arrangement and contacting the hydrocarbon feed with the regenerated catalyst in the riser conversion zone; discharging hydrocarbon conversion products and catalyst particles containing coke from the riser conversion zone into a reactor vessel located to the side of the stacked FCC arrangement and separting the hydrocarbon conversion products from the catalyst containing coke; passing catalyst from the reactor vessel to a stripping vessel located subadjacent to the reactor vessel and next to the stacked FCC arrangement and transferring catalyst particles containing coke from the stripping vessel to the bottom regenerator vessel; and, withdrawing hydrocarbon conversion products from the reactor vessel.

Other embodiments and aspects of the present invention encompass further details related to the replacement and addition of equipment to effect modification of the stacked unit and the operation of the process of this invention.

DETAILED DESCRIPTION OF THE INVENTION

The present invention in its apparatus and process aspects includes steps for changing the configuration and function of an existing stacked FCC arrangement. Arrangements to which this method can be applied will have a superadjacent upper vessel stacked above a bottom regeneration vessel and a side vessel in communication with and supported dependently from the upper vessel in a laterally offset arrangement. Use of the stacked unit will ordinarily include the addition of a new reactor vessel located to the side of the existing stacked arrangement. Therefore, the utilization of this invention will usually be accompanied by an increase in the feed processing capacity of the final FCC configuration. Thus, this invention will generally be applicable to any stacked arrangement as further described herein provided the addition of a new reactor vessel is also possible.

Figure 1:
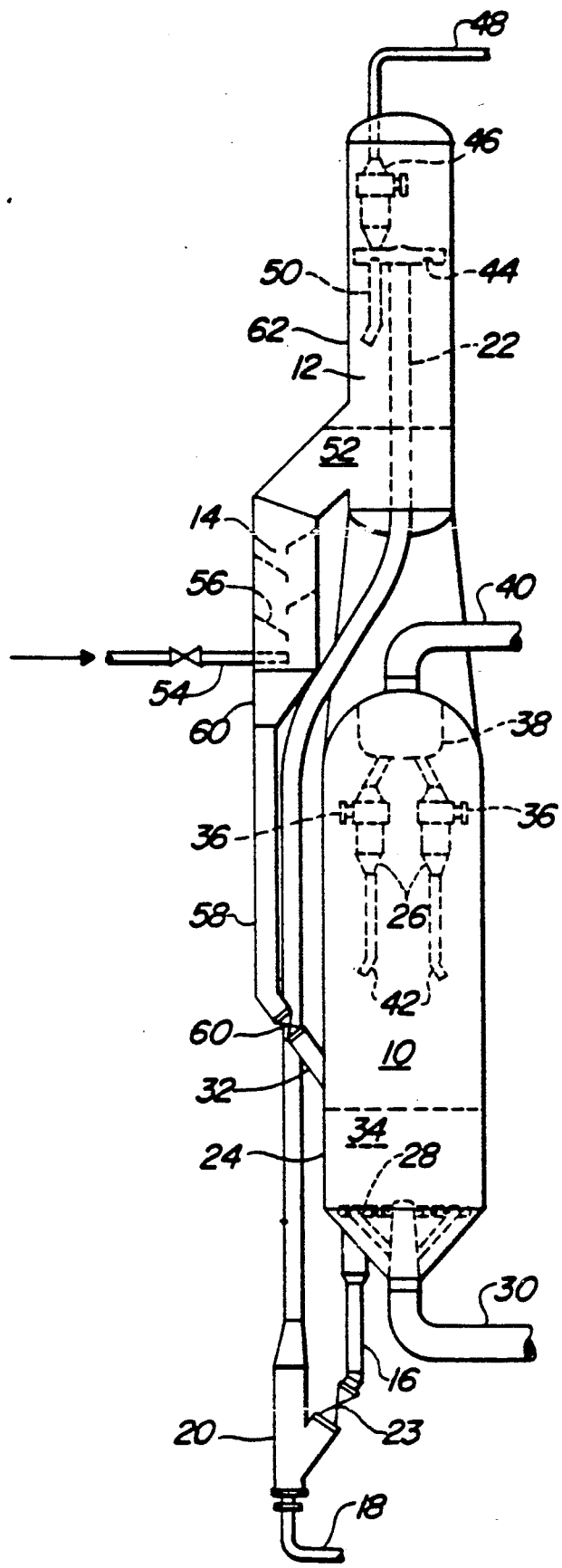
FIG. 1 is a sectional elevation view of a typical stacked FCC arrangement.

Reference is now made to FIG. 1 in order to show the type of stacked FCC configuration to which the method of this invention may be applied. Looking then at FIG. 1, a traditional stacked FCC arrangement will have a bottom regeneration vessel 10, an upper vessel 12 that functions as a reactor or reactor vessel, and a side vessel 14 that functions as a stripper or stripping vessel. An external conduit, consisting of a lower catalyst conduit 16 and a riser conduit 20, transfer catalyst from the regenerator through a control valve 23 and into riser conduit 20 where it contacts hydrocarbon feed entering the riser through a feed conduit 18. Conduit 18 may also contain a fluidizing medium such as steam which is added with the feed. Expanding gases from the feed and fluidizing medium convey catalyst up the riser and into internal riser conduit 22. As the catalyst and feed pass up to the riser, the hydrocarbon feed cracks to lower boiling hydrocarbon products.

Riser 22 discharges the catalyst and hydrocarbon mixture through openings 44 to effect an initial separation of catalyst and hydrocarbon vapors. Outside openings 44, a majority of the hydrocarbon vapors continue to move upwardly into the inlet of cyclone separator 46 which effects a near complete removal of catalyst from the hydrocarbon vapors. Separated hydrocarbon vapors exit reactor 12 through an overhead conduit 48 while a dip leg conduit 50 returns separated catalyst to a lower portion of the reactor vessel. Catalyst from riser outlets 44 and dip leg conduit 50 collects in a lower portion of the upper vessel 12 forming a bed of catalyst 52. Bed 52 supplies catalyst to side vessel 14. Steam entering side vessel 14 through a conduit 54 rises countercurrent to a downward flow of catalyst through the stripping vessel thereby removing sorbed hydrocarbons from the catalyst which are ultimately recovered with the steam by cyclone separator 46. In order to facilitate hydrocarbon removal, a series of downwardly sloping baffles 56 are provided in the stripping vessel. A catalyst conduit 56 removes spent catalyst from a lower conical section 60 of stripping vessel 14. A control valve 60 regulates the flow of catalyst from conduit 58.

Regeneration gas, such as compressed air, enters regenerator 10 through a conduit 30. An air distributor 28 disperses air over the cross-section of regenerator 10 where it contacts spent catalyst in bed 34. Coke is removed from the catalyst by combustion with oxygen from distributor 28. Combustion by-products and unreacted air components rise upwardly along with entrained catalyst through the regenerator into the inlets of cyclones 26. Relatively catalyst-free gas collects in an internal chamber 38 which communicates with a gas conduit 40 for removing spent regeneration gas from the regenerator. Catalyst, separated by the cyclones drops from the separators through dip leg conduits 42 and returns to bed 34.

The catalyst and hydrocarbon mixture entering the reactor vessel through outlets 44 usually will have a temperature of less than 540° C. (1000° F.). For this reason, the shell 62 of the reactor and stripper vessels typically comprise an unlined carbon steel or low chrome material. Similarly, internal equipment within the reactor vessel and stripper, such as cyclone separator 46, internal riser 22, and baffles 56, have a similar metallurgy. Thus, as usually encountered, the reactor and stripper vessels along with the internals cannot be used for a second stage of regeneration which is carried out at temperatures above 540° C. (1000° F.). Accordingly, without modification to withstand higher temperatures, the reactor and stripper vessels are unsuitable for the second stage of regeneration in a two-stage regeneration process. Regeneration vessel 10 will typically have a refractory lined metal shell 24 which is capable of withstanding temperatures within the regenerator in excess of 815° C. (1500° F.). Thus, the regenerator vessel itself is suitable for high operating temperatures. However, other major equipment within the regenerator including cyclone separators 26 and air distribution device 28 may be unsuitable for high temperature operation. As a result, it may be possible to use the internal regeneration equipment in the first stage of a two-stage regeneration process.

Figure 2:
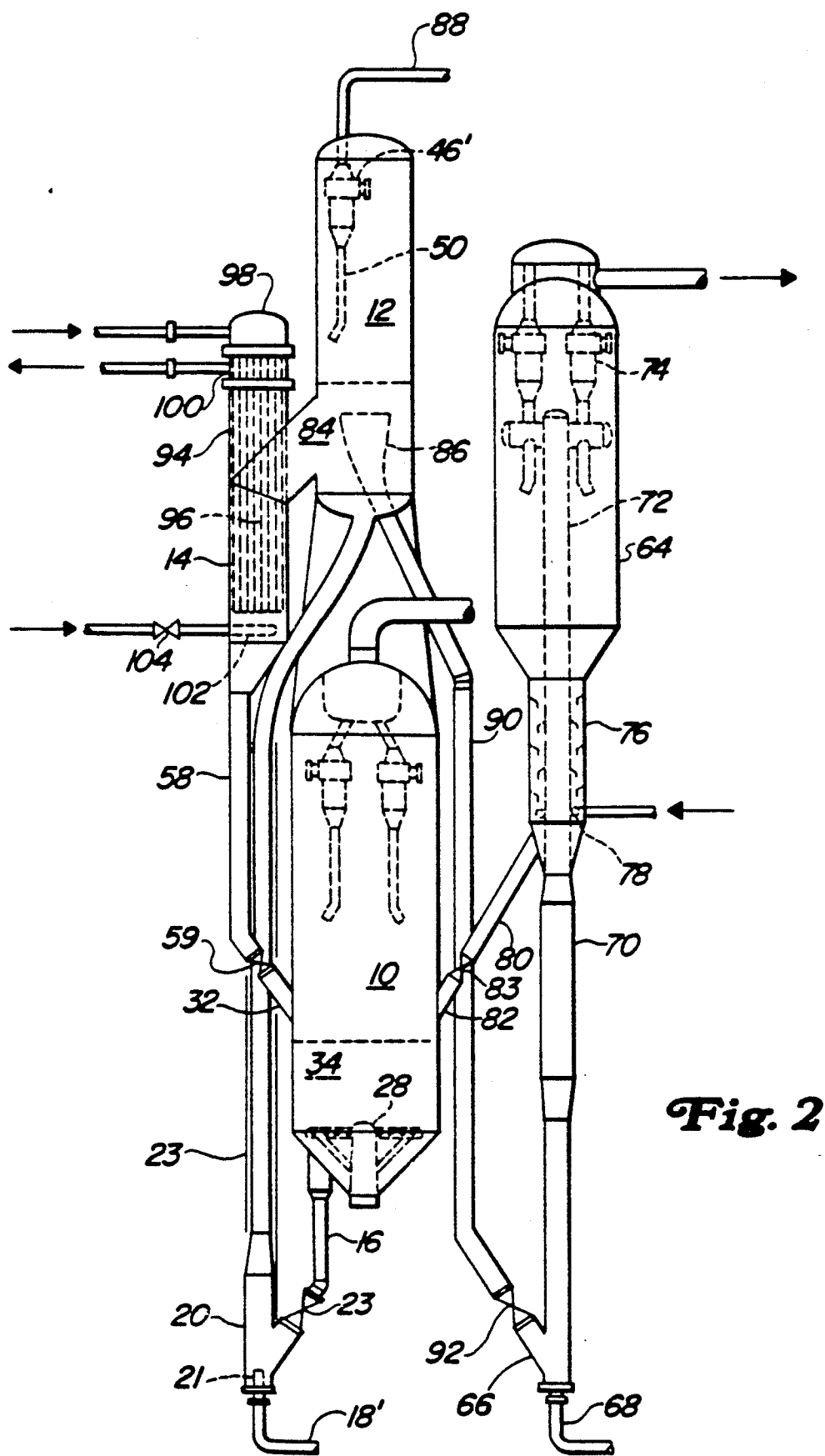
FIG. 2 is a sectional elevation view of an FCC configuration that includes a stacked FCC arrangement incorporated in accordance with this invention.

Looking then at FIG. 2, the stacked arrangement of FIG. 1 is shown in modified form as part of two-stage regeneration system for a new FCC configuration. The two-stage configuration has a reactor vessel 64 close to the side of upper vessel 12 and regenerator vessel 10. Reactor 64 is arranged for a riser cracking type operation which is well known to those skilled in the art. In this operation, regenerated catalyst enters a WYE section 66 where it contacts hydrocarbon feed entering the WYE section through pipeline 68. Expanding hydrocarbon vapor and in some cases fluidizing medium which may also enter through pipeline 68 carry the catalyst upward through an external riser 70 and an internal riser 72. The outlets of riser 72 and a pair of cyclones separators 74 separate catalyst and hydrocarbon vapors in the manner previously described for upper vessel 12 so that hydrocarbon vapors leave reactor vessel 64 through an upper vapor line 74 while the catalyst is returned to the bottom of reactor vessel 64. From the bottom of reactor vessel 64, catalyst passes downwardly through a stripping vessel 76 in countercurrent flow to steam which is injected through a distributor 78. Catalyst from the bottom of stripping vessel 76 which now contains between 0.05 and 2.0 wt. % coke returns to the regenerator vessel via a reactor catalyst conduit 80.

The reactor 64 depicts the traditional arrangement where the outlets of riser 72 are not in direct communication with the inlets of cyclone 72. Presently a number of FCC reactors have directly coupled the riser outlets to the cyclone inlets. In some cases, it may be advantageous to use such a design in a reactor design for this invention.

Typical metallurgy for cyclone separators 26 and air distribution device 28 will vary from low chrome metals to stainless steels with the former generally having a temperature limitation of about 650° C. (1200° F.) and the latter being able to withstand temperatures up to 790° C. (1450° F.).

Reactor vessel 64 and the equipment attached thereto now replace the reaction function of upper vessel 12 and the stripping function of the side vessel 14 so that these vessels and the rest of the stacked regeneration configuration may be modified to form the apparatus and be used in the process of this invention to provide additional regeneration capacity and flexibility. For a typical stacked arrangement, addition of the reactor and conversion of the existing vessels will generally provide a 20 to 60% increase in feed capacity.

FIG. 2 also shows modifications to the stacked regeneration arrangement which starting with the regenerator include the addition of conduit 80 and a slide valve 83 for carrying spent catalyst and regulating its transfer from the reactor 64 to regenerator vessel 10. In the configuration of FIG. 2, a new inlet nozzle 82 is added to the side of regenerator 10 to communicate conduit 80 with the interior of the regenerator. A new nozzle is necessary in this case since nozzle 32 is still used to deliver catalyst from side vessel 14 to the regenerator. Regenerator 10 will function as a first stage regeneration zone again having a dense bed 34. Apart from the addition of nozzle 82, regenerator 10 operates in substantially the same manner as previously described.

Preferably, the first stage of regeneration is operated in a partial CO combustion mode. In this type of operation, the first stage of regeneration will remove about 50–90% of the coke on the entering spent catalyst. In order to reduce operating temperatures and oxygen requirements, the first regeneration stage may perform only a partial oxidation of the carbon monoxide produced during coke combustion. The resulting lower temperatures and lower air addition requirements from this type of operation will facilitate the use of existing equipment within some regenerators. In regenerators where the cyclone separators 36 and air distribution device 28 are made of low alloy metal, lower regenerator temperatures, particularly those below 650° C. (1200° F.), will prolong the operating life of these materials. In addition, the air distribution device may be designed for air flow rates which are too low to supply the total oxygen demands that would be necessary to combust all of the coke and carbon monoxide in regeneration vessel 10. However, since the first stage regeneration zone only uses between 30 to 70% of the air required for complete coke and CO combustion, air distribution device 28 may be suitable for the first stage of regeneration without substantial modification.

Catalyst is again withdrawn by catalyst conduit 16 at a rate determined by control valve 23. However, in this case, the catalyst entering riser conduit 20 is only partially regenerated. Air entering through a conduit 18' contacts the partially regenerated catalyst in the bottom of riser 20 to initiate further combustion of coke from the catalyst particles. In this manner, riser 20 can function as an additional regeneration zone. The air also functions as a lift gas by transporting the catalyst particles upward through riser 20 and into the bottom of upper vessel 12. An air distribution device is provided for injecting air from line 18' into riser 20. This device can consist of a simple open pipe 21 as shown in FIG. 2. For a very large riser, the distribution can comprise multiple outlets spaced over the inside diameter of riser 20. Since the temperature of the partially regenerated catalyst entering line 16 and the lower portion of riser 20 will normally be as low or lower than the temperature of the catalyst that normally entered this region when operated as a single stacked FCC arrangement, the existing components will normally be suitable for the use in the two-stage configuration. As combustion of coke and coke by-products continues for the catalyst moving up the riser, the upper portion of the riser 20 will have equal or higher operating temperatures relative to the lower portion of riser 20. This temperature situation is opposite to what occurs when upper vessel 12 is used as a reactor and temperatures fall as the catalyst rises. Therefore, the existing upper portion of conduit 20 may not be suitable for the higher temperatures (usually above 650° C. (1200° F.)) associated with complete regeneration of the catalyst. Accordingly, it may be necessary to replace the upper portion of line 20 with a pipe section made of higher metallurgy such as stainless steel or having internal thermal insulation. In the alternative, the temperature of the metal of riser 20 can be reduced by removing external insulation thereby permitting convection cooling of the pipe surface. To a minor degree, this convective cooling also has the advantage of removing heat from the catalyst and lowering the overall catalyst temperatures in upper vessel 12 which in turn reduces the required amount of catalyst cooling. Thus, the riser 20 can provide additional means of cooling when the insulation is removed or reduced thereon.

When the riser 20 is uninsulated, it is usually desirable to surround the pipe with a metal sheeting or heat shielding to protect the conduit from direct contact with the elements. The metal sheeting is offset from the conduit to form an annular space between the sheeting and the conduit. An open bottom and top and bottom between the sheeting and the conduit can be used to form an updraft and increase cooling of the conduit of the wall. This updraft and the resultant cooling enables the conduit to increase the heat removal from the catalyst in the riser conduit.

Figure 3:
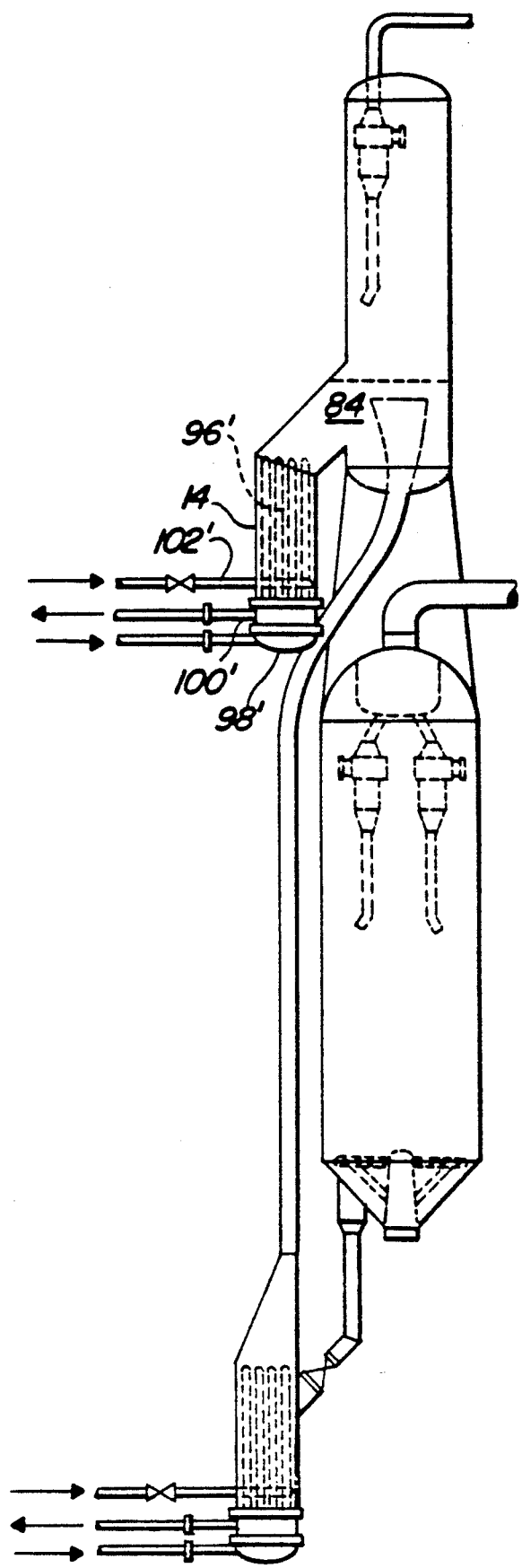
FIG. 3 is a partial sectional elevation view of a stacked FCC arrangement showing an alternate arrangement for the catalyst heat removal zone.

A second cooling vessel can be located in and along the flow path of at least one of the lower catalyst conduit and the regenerator riser conduit to cool the catalyst particles passing therethrough. In one arrangement, such a second catalyst cooler will receive catalyst from the lower end of the lower catalyst conduit and deliver catalyst to the lower end of the regenerated catalyst riser. Such an arrangement is shown in FIG. 3.

Upper vessel 12 functions as a disengaging vessel and, to the extent required, a second stage combustion zone. Upper vessel 12 can be operated as a combustion zone when unconverted coke or coke by-products enter upper vessel 12 with catalyst from riser 20. A dense bed 84 is maintained in vessel 12 and receives catalyst from riser 20. Dense bed 84 has a level at or above an internal hopper 86. Internal riser 22 is removed to make room for hopper 86. Spent regeneration gas and entrained catalyst travel upward from bed 84 and enter a cyclone separator 46' where gas is separated from the catalyst and recovered overhead by conduit 88 while catalyst particles are returned to bed 84. Spent regeneration gas for the complete regeneration operation of vessel 12 will contain 1 to 10% excess oxygen. Due to the higher temperatures associated with the complete regeneration operation, cyclone separator 46 is replaced with a new cyclone separator made of stainless steel material. Hopper 86 collects fully regenerated catalyst particles from bed 84 which are removed from upper vessel 12 by a regenerated catalyst conduit 90 that delivers the catalyst particles to WYE section 66.

In the embodiment of FIG. 2, catalyst is also withdrawn from bed 84 into side vessel 14. Catalyst can be again taken from the bottom of vessel 14 and delivered to regenerator 10 by conduit 58 which now functions as a cooler conduit. Vessel 14 is modified by the addition of a cooler shell 94 and the insertion of heat exchange tubes 96. Heat exchange tubes 96 are of a bayonette type. A cooling fluid, typically water or saturated steam, enters a distributor head 98 which distributes the fluid to the bayonette tubes. Fluid leaving the bayonette tubes is recovered in a chamber 100 and withdrawn from the cooler. Contact of the catalyst with cooling tubes 96 removes heat from the regeneration section and provides a source of relatively cool catalyst particles. The cooler may be operated in a downflow mode to transport relatively cool catalyst particles, via a conduit 58, into the first stage regeneration zone of vessel 10. The cooler may also be operated in a backmix mode wherein catalyst is circulated between tubes 96 and dense bed 84.

The fluidizing gas, typically air, enters vessel 14 at a point below tubes 96 through a distributor 102. A control valve 104 regulates the flow of fluidizing medium into distributor 102. A small amount of fluidizing medium is introduced to facilitate catalyst flow through the cooler and promote a good distribution of catalyst around tubes 96. As downward flow of catalyst through vessel 14 is interrupted by control valve 59, an increased amount of air can be added through distributor 102 to increase the amount of catalyst backmixing with dense bed 84. Additional information on the operation of catalyst coolers can be obtained from the previously cited references.

In an alternative and somewhat simpler embodiment, vessel 14 may house a catalyst cooler that is only operated in the backmix mode. FIG. 3 illustrates this embodiment where the lower portion of vessel 14 is closed by a chamber 100' and a distributor head 98'. In FIG. 3, the heater exchanger tubes 96' extend upward from the chamber and distributor head. Fluidizing gas enters vessel 14 through a distributor 102' located near chamber 100'. In this type of operation, heat transfer and the exchange of catalyst with bed 84 is completely controlled by the addition of fluidizing gas through distributor 102'. Although this arrangement only allows cooled catalyst particles to enter the second stage of regeneration, it simplifies the operation of the unit by eliminating an additional control valve and catalyst transfer line. In addition, it allows nozzle 32 to be used for receiving spent catalyst from reactor 64.

The description of this invention in the context of specific embodiments is not meant to limit the scope of this invention to those embodiments shown herein. In particular, the suggested reuse of various existing items of equipment such as cyclones, air distributors, and catalyst lines are not intended to limit the scope of this invention to an arrangement or process that makes use of specific items apart from the regenerator vessel, reactor vessel, and stripper vessel.

I claim:

1. An apparatus for converting a hydrocarbon feed in a reaction zone using fluidized catalyst particles and continuously regenerating said catalyst particles after contact with said hydrocarbon feed, said apparatus comprising:
   (a) a reactor riser conduit for receiving a hydrocarbon feed, said riser conduit having an upstream end in communication with a regenerated catalyst conduit to transfer catalyst particles to said riser conduit and downstream end for discharging a mixture of said hydrocarbon and catalyst particles;
   (b) a reactor vessel in communication with said downstream end of said riser conduit, said reactor vessel enclosing means for at least partially separating said hydrocarbons from said catalyst particles;
   (c) a stripping vessel in open communication with a lower portion of said reactor vessel for collecting catalyst particles from said reactor vessel;
   (d) a spent catalyst conduit having an inlet end in communication with a lower portion of said stripping vessel and an outlet end;
   (e) a stacked regeneration tower comprising a lower regeneration vessel and upper regeneration vessel located superadjacent to and concentrically supported from said lower regeneration vessel, said upper regeneration vessel having a smaller diameter than said lower regeneration vessel and said outlet end of said spent catalyst conduit communicating with said lower regeneration vessel to receive catalyst particles;
   (f) means for distributing an oxygen-containing gas over a lower section of said lower regeneration vessel;
   (g) a lower catalyst conduit for withdrawing catalyst particles from said lower regeneration vessel having at least a lower portion positioned external to said lower regeneration vessel;
   (h) a regenerator riser conduit communicating with the lower end of said lower catalyst conduit for receiving catalyst therefrom and having a lower end positioned external to said upper and lower regeneration vessels and an upper end in communication with said upper regeneration vessel to discharge catalyst particles therein and at least a portion of the external wall of said regenerator riser provides means for cooling catalyst particles;
   (i) means for injecting an oxygen-containing gas into a lower portion of said regenerator riser conduit;
   (j) means for creating a draft along at least a portion of the external wall of said regenerator riser and cooling catalyst passing from the lower regeneration vessel to the upper regeneration vessel; and
   (k) a first cooler vessel horizontally offset from and in direct communication with said upper regeneration vessel for circulating catalyst particles between said upper regeneration vessel and said cooler vessel, said cooler vessel having means for indirectly contacting said catalyst particles therein with a cooling fluid and means for distributing a fluidizing medium over a lower portion of said cooler vessel.

2. An apparatus for converting a hydrocarbon feed in a reaction zone using fluidized catalyst particles and continuously regenerating said catalyst particles after contact with said hydrocarbon feed, said apparatus comprising:
   (a) a reactor riser conduit for receiving a hydrocarbon feed, said riser conduit having an upstream end in communication with a regenerated catalyst conduit to transfer catalyst particles to said riser conduit and downstream end for discharging a mixture of said hydrocarbon and catalyst particles;
   (b) a reactor vessel in communication with said downstream end of said riser conduit, said reactor vessel enclosing means for at least partially separating said hydrocarbons from said catalyst particles;
   (c) a stripping vessel in open communication with a lower portion of said reactor vessel for collecting catalyst particles from said reactor vessel;
   (d) a spent catalyst conduit having an inlet end in communication with a lower portion of said stripping vessel and an outlet end;
   (e) a stacked regeneration tower comprising a lower regeneration vessel and upper regeneration vessel located superadjacent to and concentrically supported from said lower vessel, said upper vessel having a smaller diameter than said lower vessel and said outlet end of said spent catalyst conduit communicating with said lower vessel to receive catalyst particles;

(f) means for distributing an oxygen-containing gas over a lower section of said lower regeneration vessel;

(g) a lower catalyst conduit for withdrawing catalyst particles from said lower regeneration vessel having at least a lower portion positioned external to said lower vessel;

(h) a regenerator riser conduit communicating with the lower end of said lower catalyst conduit for receiving catalyst therefrom and having a lower end positioned external to said upper and lower regeneration vessels and an upper end in communication with said upper regeneration vessel to discharge catalyst particles therein and at least a portion of the external wall of said regenerator riser provides means for cooling catalyst particles;

(i) means for injecting an oxygen-containing gas into a lower portion of said regenerator riser conduit;

(j) a first cooler vessel horizontally offset from and in direct communication with said upper regeneration vessel for circulating catalyst particles from said upper regeneration vessel to said cooler vessel, said cooler vessel having means for indirectly contacting said catalyst particles therein with a cooling fluid and means for distributing a fluidizing medium over a lower portion of said cooler vessel; and (k) a second cooling vessel located along the flow path between said lower regeneration vessel and said upper regeneration vessel to cool the catalyst particles passing therethrough.

* * * * *